US008708685B2

(12) United States Patent  
Hickerson et al.

(10) Patent No.: US 8,708,685 B2  
(45) Date of Patent: Apr. 29, 2014

(54) IMAGING ASSEMBLY

(71) Applicant: 3D Systems, Inc., Rock Hill, SC (US)

(72) Inventors: Kevin Hickerson, Altadena, CA (US); Jay Wright, Pasadena, CA (US); Omar Ahsan, Thousand Oaks, CA (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 13/773,179

(22) Filed: Feb. 21, 2013

(65) Prior Publication Data

US 2013/0164402 A1    Jun. 27, 2013

Related U.S. Application Data

(63) Continuation of application No. 12/626,415, filed on Nov. 25, 2009, now abandoned.

(51) Int. Cl.
 *B29C 35/08* (2006.01)
(52) U.S. Cl.
 USPC .......... 425/174.4; 425/375; 359/733
(58) Field of Classification Search
 USPC ............... 425/174.4, 375; 359/733
 See application file for complete search history.

(56) References Cited

U.S. PATENT DOCUMENTS

| | | | |
|---|---|---|---|
| 4,669,866 A | 6/1987 | Phillips | |
| 5,530,595 A | 6/1996 | Freedenburg et al. | |
| 6,123,429 A | 9/2000 | Osawa | |
| 7,271,952 B2 | 9/2007 | Suzuki et al. | |
| 2003/0214571 A1 | 11/2003 | Ishikawa et al. | |
| 2005/0208168 A1 | 9/2005 | Hickerson et al. | |
| 2006/0019179 A1 | 1/2006 | Leunissen et al. | |

FOREIGN PATENT DOCUMENTS

| | | |
|---|---|---|
| DE | 1020080082620 | 7/2008 |
| EP | 1233272 | 8/2002 |
| FR | 2692067 | 12/1993 |
| JP | 7299874 | 11/1995 |
| WO | 9515841 | 6/1995 |
| WO | 2007009526 | 1/2007 |
| WO | 2007112808 | 11/2007 |

OTHER PUBLICATIONS

English Translation of Japan's First Office Action for Japanese Application No. 2012-591621 dated Aug. 20, 2013 (1 page).
PCT Partial International Search Report for International Application No. PCT/US2010/040921.
PCT International Search Report for International Application No. PCT/US2010/040921.
PCT Written Opinion of the International Searching Authority for International Application No. PCT/US2010/040921.

*Primary Examiner* — James Sanders

(57) ABSTRACT

A imaging assembly for generating a light beam suitable for sintering comprises a lamp housing and a lamp mounted in the lamp housing comprising a filament and a lamp base, wherein the lamp is oriented with the lamp base to the side of the filament. The imaging assembly further comprises a reflector, an aperture, and at least one condenser lens configured to focus light emitted by the filament through the aperture. The imaging assembly further comprises a set of achromatic doublet lenses, each achromatic doublet lens comprising three surfaces optimized to focus light at three wavelengths, wherein the set of achromatic doublet lenses focuses light over a range including the three wavelengths. The imaging assembly further comprises an outer lens, wherein the focused light beam exits the imaging assembly through the outer lens.

20 Claims, 10 Drawing Sheets

IMAGING ASSEMBLY

CROSS REFERENCE TO RELATED APPLICATION

This application is a continuation of copending U.S. patent application Ser. No. 12/626,415, filed Nov. 25, 2009, which is hereby incorporated herein in its entirety by reference. This application claims the benefit of U.S. Provisional Patent Application Ser. No. 60/270,800, filed Jul. 6, 2009, which is hereby incorporated by reference herein in its entirety.

BACKGROUND OF THE INVENTION

1. Field of the Invention

The disclosure described herein pertains to the field of computer printers configured to generate three dimensional objects from a computer data file. More particularly, but not by way of limitation, the disclosure provided here is directed to an imaging system and methods for generating three dimensional objects using an optical focusing system, sources of heat and simple motion systems.

2. Description of the Related Art

Solid imaging systems, including three dimensional (3D) printers and rapid prototyping (RP) systems, are primarily used to produce objects and prototype parts from 3D computer-aided design (CAD) tools. Most RP systems use an additive, layer-by-layer approach to building parts by joining liquid, powder, or sheet materials to form physical objects. The data referenced in order to create the layers is generated from a CAD system file using thin, horizontal cross-sections of the model. Typically, layers are constructed using a thin layer of a sinterable powder that is formable into a coherent mass through the application of heat. The prior art 3D printing systems that make use of heat to join the materials together generally employ high powered lasers and high precision motion systems containing a multitude of actuators to generate parts; resulting in a 3D printer which is generally not cost effective for the majority of home/hobbyist users or small mechanical design groups.

U.S. Pat. No. 7,261,542 describes a 3D printer system which does not require high powered lasers or high precision motion systems, which is hereby incorporated by reference in its entirety. This 3D printer system uses an incoherent energy source whose energy is focused to provide a small area of concentrated heat to generate layer-by-layer 3D printing.

In 3D printing involving sintering, the elevated temperatures required make implementation of cost effective optics problematic. Standard optical and electrical components and materials are designed for use within an operational temperature range. Furthermore, it has been found that, if a glass surface near a sintering surface dips close to the melting temperature of the sintering material, the glass surface collects a film of the material, limiting light transmission. Therefore, optics located near a sintering surface must be frequently checked for contaminants that might block light transmission and when necessary cleaned and maintained.

For at least the reasons described above there is a need for an optical imaging assembly for use within a 3D printer system that can generate a focused light for sintering without accumulating materials that reduce light transmission and without having expensive cooling systems or expensive optical elements in the high-temperature environment needed for sintering.

BRIEF SUMMARY OF THE INVENTION

One or more embodiments of the imaging assembly described in this disclosure are configured to generate a light beam suitable for sintering. The imaging assembly includes a lamp housing, and a lamp comprising a filament and a lamp base which is mounted in said lamp housing. The lamp is oriented in at least one exemplary embodiment with the lamp base to the side of the filament. While other lamps are suitable, a tungsten halogen lamp with a color temperature of 3200° K functions as a usable lamp. The lamp base is coupled with a heat sink having a highly thermally conductive material, such as black anodized aluminum. The lamp base is maintained at an operational temperature. The heat sink may be exposed to a stream of forced air to maintain the operational temperature. In an exemplary embodiment, the operational temperature is below 350° C.

The imaging assembly also includes a reflector and an aperture. Light generated by the lamp passes through the aperture. The reflector reflects the light from the filament back toward the filament and onto the object plane. The reflector may be a mirror which projects the image of the filament. In one or more embodiments of the imaging assembly, the mirror is gold-plated or includes a dielectric bandpass or broadband-pass coating. In one or more embodiments the imaging assembly contains a longitudinal axis of the lamp filament parallel to the focal plane of the imaging assembly. The aperture may include a mechanical shuttering system for adjusting said focused light beam. For example, an aperture disc comprising at least one light transmissive aperture and at least one opaque area for blocking said light emitted from the lamp can function as the mechanical shuttering system. The at least one light transmissive aperture may vary in size to adjust the focused light beam from about 0.010 inch to 0.120 inch in diameter.

At least one condenser lens is configured to focus light emitted by the filament through the aperture. The condenser len(s) is generally maintained at a temperature below about 0.6× the glass transition temperature of the lamp-adjacent condenser lens, thus preserving the mechanical and optical properties of the lamp-adjacent condenser lens. The at least one condenser lens comprises a lamp-adjacent condenser lens and a second condenser lens. At least one condenser lens is mounted in a material with high thermal conductivity, such as black anodized aluminum.

A set of achromatic doublet lenses, each achromatic doublet lens comprising three surfaces, focuses light over a range including the three wavelengths. In one or more embodiments of the imaging assembly set forth in this disclosure, at least one of the three wavelengths is above about 750 nm, preferably near-infrared in the range between 600 nm and 1200 nm. At least one of the three wavelengths may include wavelengths in the near infrared region of the electromagnetic spectrum. The achromatic doublet lenses are mounted in a material with a high thermal conductivity, such as anodized black aluminum. The achromatic doublet lenses are maintained at an operational temperature below a maximum doublet lens temperature based on a thermal tolerance of a bonding site of the achromatic doublet lenses to minimize thermal cycling that can degrade the lenses. For example, in one embodiment the operational doublet lens temperature within the imaging assembly is about 85° C.

The focused light beam exits the imaging assembly through an outer lens positioned on an exterior of the imaging assembly. The outer lens is maintained at or above a determined threshold temperature to inhibit or prevent the sintering material or any out-gassed material components from condensing on the lens. The determined threshold temperature is a temperature above the ambient temperature surrounding a layer of sinterable powder in a 3D printer. The predetermined threshold temperature may be based on a melting point of a sinterable material. In an exemplary embodiment, the sintering material is nylon 12 and the predetermined threshold temperature is about 140° C. The outer lens may be heated to the determined threshold temperature before a sintering operation is started by exposing the outer lens to focused light from the lamp before the operation.

One or more embodiments of the imaging assembly described in this disclosure include a first optical subsystem and a second optical subsystem. The first optical subsystem contains a lamp filament in the first object plane. A reflector images the filament back towards the object plane. In one or more embodiments, the reflector is a gold plated mirror or broadband dielectric mirror. Light continues to travel through the lamp filament and is focused by at least one condenser lens such that the light converges at an image plane of the first optical subsystem. The light focused by the at least one condenser lens passes through an aperture and enters the second optical subsystem. The entrance pupil of the second optical subsystem may be aligned with the first image plane to maximize light passing through the second optical subsystem.

The object plane of the second optical subsystem is the aperture of the first optical subsystem. In the second optical subsystem, the light is achromatically focused by a set of achromatic doublet lenses. The light passes through an outer lens and converges at a second image plane of the second optical subsystem. A layer of sinterable powder is aligned with the second image plane or is located a small distance away from the second image plane.

One or more embodiments of the imaging assembly make use of a source cell which is associated with the lamp and the at least one condenser lens, a doublet cell which is associated with the set of achromatic doublet lenses, a thermal barrier positioned between the source cell and the doublet cell, an outer cell associated with the outer lens, and an outer mount constructed from a material with low thermal conductivity. A stream of forced air 416 is directed through the doublet cell, the thermal barrier and, or the source cell, such that the stream of forced air 416 cools at least one component of the imaging assembly. Optionally, the stream of forced air 416 is directed to the outer cell after passing through the source cell to heat the outer cell. The stream of forced air 416 may be generated by a fan. The imaging assembly may include at least one channel through which the stream of forced air 416 travels.

The imaging assembly may have a source cell including a lamp and at least one condenser lens, a doublet cell including a set of achromatic doublet lenses, a thermal barrier positioned between the source cell and the doublet cell, and an outer cell comprising an outer lens and an outer mount constructed from a material with low thermal conductivity. A stream of forced air is directed over at least one of the doublet cell, the source cell and the outer cell to maintain the temperature of at least one element of the imaging assembly. The thermal barrier comprises an aperture, wherein the at least one condenser lens is configured to focus light generated from the lamp through the aperture. A focused beam of light exits the imaging assembly via the outer lens.

BRIEF DESCRIPTION OF THE DRAWINGS

The above and other aspects, features and advantages of the system and method described herein will be more apparent from the following more particular description thereof, presented in conjunction with the following drawings wherein.

DETAILED DESCRIPTION

An imaging assembly will now be described. In the following exemplary description numerous specific details are set forth in order to provide a more thorough understanding of embodiments of the invention. It will be apparent, however, to an artisan of ordinary skill that the systems and methods described throughout this disclosure may be practiced without incorporating all aspects of the specific details described herein. In other instances, specific features, quantities, or measurements well known or easily ascertained by those of ordinary skill in the art have not been described in detail so as not to obscure the points of innovation. Readers should note that although examples of the systems and methods used to implement one or more aspects of the invention are set forth herein, the claims, and the full scope of any equivalents, are what define the invention.

Figure 1:
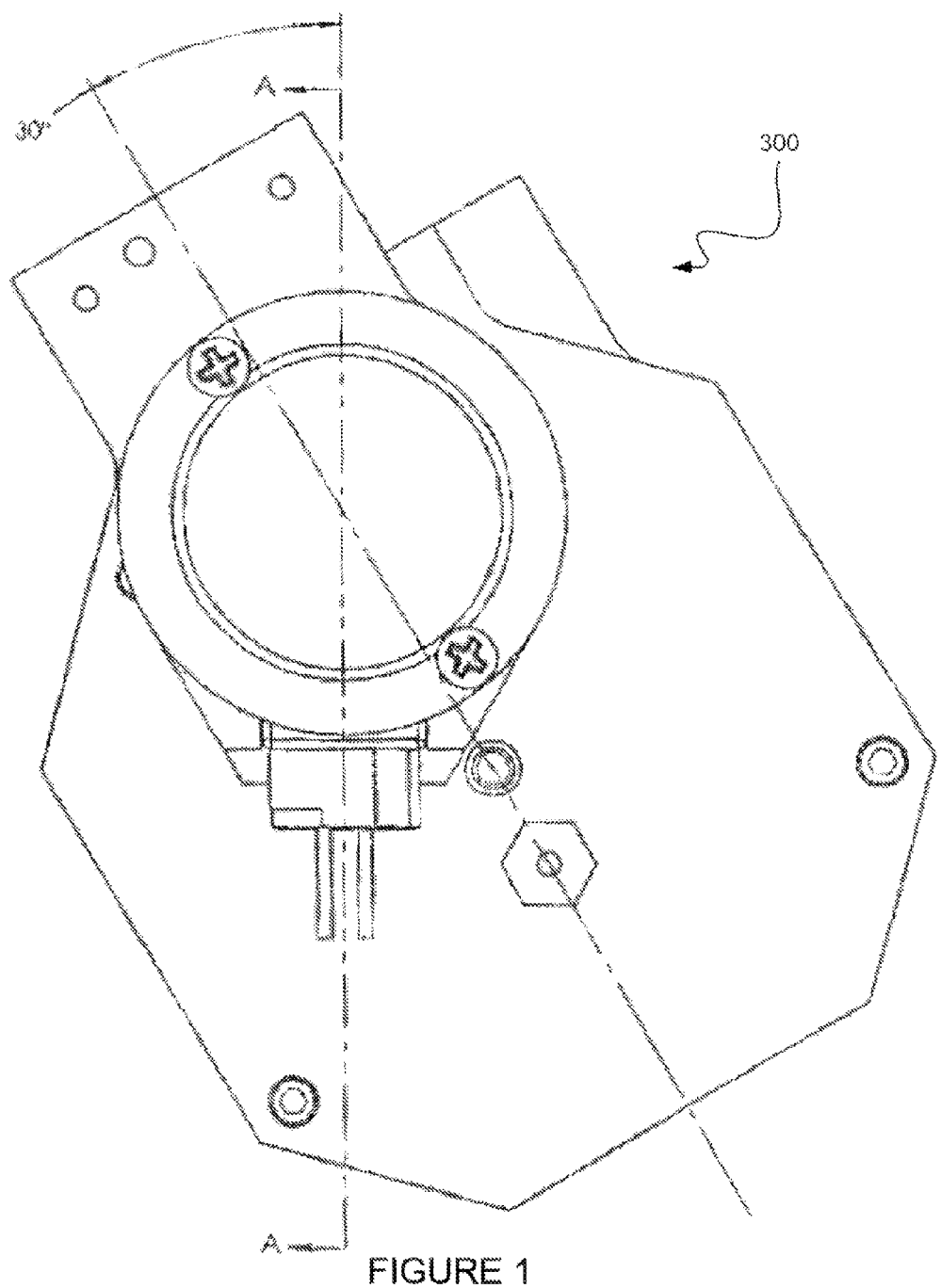
FIG. 1 is a top view of an exemplary embodiment of the imaging assembly.
Figure 3:
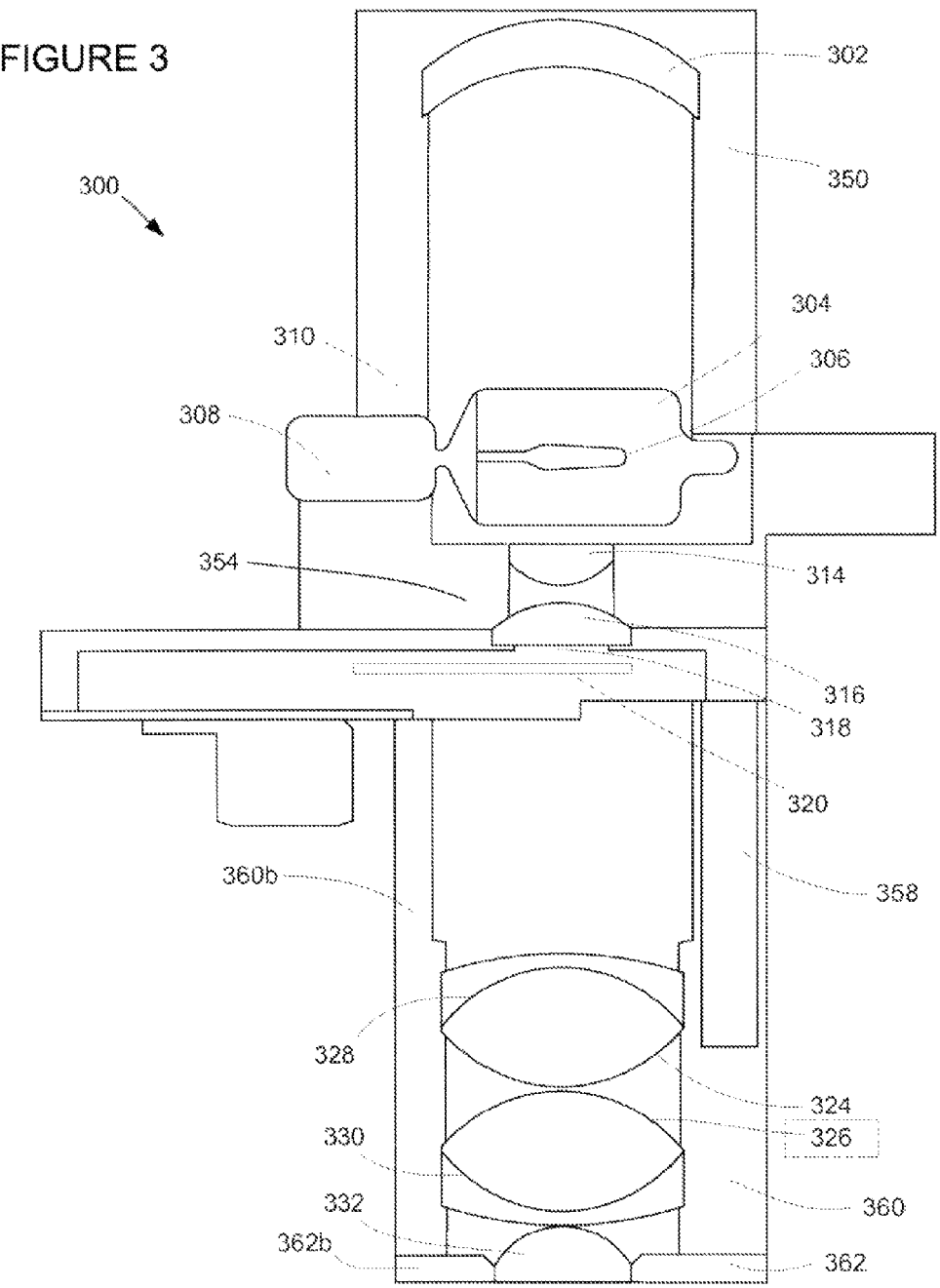
FIG. 3 is a cross sectional view of an exemplary embodiment of the imaging assembly taken along line A-A of FIG. 1.

FIG. 1 illustrates a top view of one or more embodiments of a imaging assembly 300. FIG. 3 illustrates a cross sectional view of imaging assembly 300 taken from line A-A of FIG. 1. Imaging assembly 300 delivers a beam of light focused onto a target sintering medium. Imaging assembly is located a sufficient distance away from the target to avoid potential problems associated with the sintering medium contacting glass surfaces of imaging assembly 300. In one example of the implementation described herein, imaging assembly is located about 0.18 inches away from the target sintering medium.

Imaging assembly 300 includes lamp housing 350. Lamp 304 is positioned in lamp housing 350. Lamp 304 is typically a tungsten halogen lamp. Tungsten halogen lamps provide a broadband heat source which allows for the use of inexpensive printing media that is not tuned to specifically absorb light at a specific wavelength. The halogen lamp is available from Sylvania of Danvers, Mass., although any of a number of other heat sources may be used including tungsten bulbs and are lamps. In one example, a EML-type 24V 185 W tungsten halogen lamp with a color temperature of 3200K is used.

Lamp 304 comprises lamp base 308 and lamp filament 306. Lamp 304 is typically oriented such that lamp base 308 is positioned to the side of lamp filament 306, reducing the heating of lamp base 308 through free convective heat transfer. Reliability testing has shown that a heated environment such as a 3D printer can damage lamp 304, including a tungsten halogen lamp. Specifically, the 'pinch' section of the lamp and the adjacent ceramic base reach temperatures above the operational limits set forth in applicable specifications. For a tungsten halogen lamp used in embodiments of imaging assembly 300, designated EML by ANSI, the base of the lamp may not exceed 350° C.

Lamp base 308 is coupled to lamp heat sink 310 that provides a path for conductive heat transfer away from lamp base 308. Lamp heat sink 310 may comprise a large heat-sinking mass constructed from aluminum, copper, an alloy or any other material suitable for use as a heat-sinking mass for dissipating heat. In embodiments of imaging assembly 300, lamp heat sink 310 comprises an array of rows, holes, protrusions or other structure which increases the exposed surface area of lamp heat sink 310, increasing the heat dissipation rate. In embodiments of imaging assembly 300, lamp heat sink 310 also functions as a structural element of imaging assembly 300. For example, lamp heat sink 310 may comprise a series of features integrated into lamp housing 350. Additionally, forced air may be directed over or through at least a portion of lamp heat sink 310, further increasing the heat dissipation rate.

Lamp housing 350 is typically constructed from a highly thermally conductive material, such as black anodized aluminum, dispersing extraneous light as heat outside of imaging assembly 300 to maintain the temperature within imaging assembly 300 at an acceptable level. Lamp housing 350 may comprise an array of rows, holes, protrusions or other structure which increases the exposed surface area of lamp housing 350, increasing the heat dissipation rate. Additionally, forced air may be directed over or through at least a portion of lamp housing 350, further increasing the heat dissipation rate.

Lamp housing 350 includes reflector 302. Reflector 302 reflects light generated by lamp 304. Reflector 302 comprises a convex reflective surface constructed from or coated with a reflective material such as a mirror, metal, foil, a reflective paint, or any other reflective material. For example, reflector 302 may comprise a gold coating or broadband dielectric coating. Reflector 302 may be integrated into the surface of lamp housing 350. Reflector 302 and lamp 304 are optimally positioned to maximize the energy of a focused light beam generated by imaging assembly 300. Reflector 302 comprises a curvature which is generally centered over lamp filament 306. Reflector 302 is configured to image lamp filament 306 back through itself to increase an effective fill factor for additional power transmission. In a one embodiment, lamp filament 306 comprises about 50% open space through which reflector 302 reflects light.

Imaging assembly 300 further utilizes at least one condenser lens. The embodiments of imaging assembly 300 shown in FIG. 3 comprise lamp-adjacent condenser lens 314 and condenser lens 316. Condenser lenses 314, 316 focus light generated by lamp 304 through aperture 318. Reliability testing has shown that lamp-adjacent condenser lens 314, 316 may crack due to thermal shock if condenser lenses 314, 316 are not held at a stable low temperature. Condenser lenses 314. 316 may be selected to withstand a high temperature. In one embodiment, condenser lens 314 is made from glass type S-LAH64 and condenser lens 316 is made from glass type N-BK7. At least one condenser lens may be coated with an anti-reflective coating, such as Thor Labs 'B' Broadband anti-reflective with an effective range of 650-1050 nm.

Condenser lenses 314, 316 are mounted in a heat-sinking mass such as condenser heat sink 354. Condenser heat sink 354 may include a large heat-sinking mass constructed from aluminum, copper, an alloy or any other material suitable for use as a heat-sinking mass for dissipating beat. Condenser heat sink 354 contains an array of rows, holes, protrusions or other structure that increases the exposed surface area of condenser heat sink 354, increasing the heat dissipation rate. Additionally, forced air may be directed over or through at least a portion of condenser heat sink 354, further increasing the heat dissipation rate.

Condenser lenses 314, 316 focus light generated by lamp 304 through aperture 318. Aperture 318 is positioned such that filament 306 is spread across substantially all of aperture 318. In one or more embodiments, aperture 318 is changeable to adjust the size of the focused light beam produced by imaging assembly 300, providing a low-cost method of altering drawing speed and resolution which is achieved by varying beam size. Embodiments of imaging assembly 300 include a shuttering device for effectively interrupting the focused light beam by closing aperture 318.

Aperture disc 320 which is included in imaging assembly 300 provides a means to mechanically change the aperture and a mechanical shuttering system. Aperture disc 320 comprises multiple apertures of different sizes for modifying the beam size and shape and multiple opaque areas which block the beam. A motor, such as a stepper motor, may drive aperture disc 320 such that either an aperture opening or an opaque area may be positioned in the light path of light from lamp 304. If an aperture opening is chosen, then the light passes through the remaining lenses and a focused spot is produced outside the imaging assembly and on the layer of sinterable powder. If an opaque area is chosen, then the light is not allowed to exit the sintering device and is instead absorbed by the thermal mass of sintering device 300. Although the aperture system shown in FIG. 3 contains aperture 318 and aperture disc 320, any system comprising an aperture and a shuttering device operable at a speed suitable for sintering may be used with imaging assembly 300.

In embodiments of imaging assembly 300, the motor is configured such that aperture disc 320 can quickly alternate between an open state (in which light is transmitted through an aperture) and a closed state (in which light is blocked by opaque portion of aperture disc) in a process called "shuttering." Shuttering in this manner is useful for many approaches in 3D printing. A cost-effective mechanical shuttering implementation is desirable in a low-cost imager using a light source such as a tungsten halogen lamp which cannot be switched on and off quickly enough for the shuttering to occur without a mechanical shutter. A person of ordinary skill in the art would recognize that, while an aperture disc is illustrated in the embodiment shown in FIG. 3, other mechanical shuttering systems may be used to perform substantially the same task.

In one or more embodiments, a range is provided for aperture 318 such that the entire range can deliver sufficient power for sintering. Varying the spot size by changing aperture 318 provides a unique low cost method of altering drawing speeds and resolutions while minimizing the size and cost of imaging assembly 300. By choosing small or large apertures, the focused spot size created by imaging assembly 300 can be adjusted from about 0.010 inch to 0.120 inch. Although a round aperture is typically used, creating a round focused spot, additional aperture opening shapes may be used to modify the shape of the focused spot for special applications. Aperture disc 320 may include an aperture opening comprising a parabolic surface of revolution or compound parabolic surface of revolution, for example, a Winston cone, that further concentrates the light from lamp 304 to produce a smaller spot.

Figure 10:
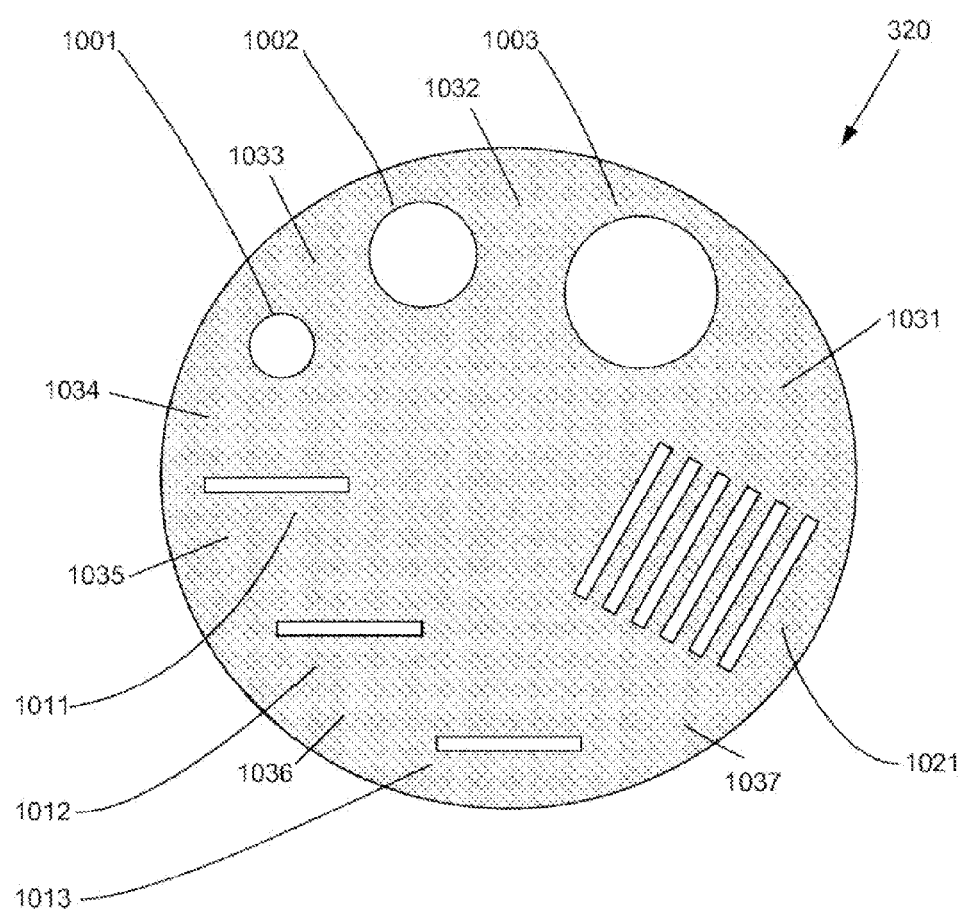
FIG. 10 is a top view of an exemplary embodiment of an aperture disc usable with embodiments of the imaging assembly.

One embodiment of aperture disc 320 is illustrated in detail in FIG. 10. Aperture disc 320 comprises at least one light transmissive aperture 1001-1003. Light transmissive apertures 1001-1003 may comprise any material that is light transmissive, such as a clear glass or plastic. Light transmissive apertures 1001-1003 may also comprise gaps or holes in the material comprising aperture disc 320. Light transmissive apertures 1001-1003 may be shaped to affect the shape of an image produced on a sintering surface. For example, light transmissive apertures 1001-1003 may be circular, square, or any other shape. When a circular aperture is selected, imaging assembly 300 produces a radially symmetric image on a sintering surface. When a square aperture is selected, imaging assembly 300 produces an image on a sintering surface such that, when the image is moved across a sintering surface at a constant rate, the sintering powder in the sintering path is more evenly exposed due to a uniform exposure time at each point in the sintering path. Light transmissive apertures 1001-1003 of varying sizes provide a means for varying characteristics of the light beam produced by imaging assembly 300, including the size of an image produced on a sintering surface.

Aperture disc 320 may also comprise single slit apertures 1011-1013. Single slit apertures 1011-1013 differ in orientation with respect to the center of aperture disc 320 and each produce a slit image at a different angle on a sintering surface. Single slit apertures 1011-1013 provide a further means for varying characteristics of the light beam produced by imaging assembly 300. Single slit apertures 1011-1013 may be useful to achieve a faster rate for sintering thin features, such as panels, rods, or any other thin structure extending in a substantially straight direction. Single slit apertures 1011-1013 may be straight or curvilinear. For example, imaging assembly 300 may be used to form breakaway materials. In layer-by-layer printing of a 3D object, breakaway materials are useful as support in the lower layers as upper layers are being added. The breakaway material is easily removed from the finished 3D object after printing. Breakaway material for support during 3D printing may comprise a series of parallel thin panels, a mesh structure, or any other partially filled pattern. Aperture disc 320 may further comprise multiple slit aperture 1021. Multiple slit aperture 1021 may be useful to achieve a faster rate for sintering multiple parallel thin features, such as panels, rods, or any other thin structure extending in a substantially straight direction. For example, imaging assembly 300 may be used to form breakaway materials. The individual features of multi slit aperture 1021 may be straight or curvilinear.

A motor may be used to rotate aperture disc 320 to change the aperture used by imaging assembly 320. Aperture disc 320 further comprises opaque areas 1031-1037. Opaque areas 1031-1037 extend between light transmissive apertures provided on aperture disc 320. Shuttering may be implemented by rotating aperture disc 320 to prevent light from passing aperture disc 320 by blocking light generated by lamp 304 with one of opaque areas 1031-1037. In one or more embodiments, aperture disc 320 is comprised of an opaque material. Alternatively, aperture disc 320 is coated with a film, paint, powder, glaze or other surface to provide at least one opaque area 1031-1037.

After light from lamp 304 passes through aperture 318, the light is further focused by achromatic doublet lenses 324-326. Achromatic doublet lenses 324-326 effectively focus multiple light wavelengths. Achromatic doublet lenses each have three independent surfaces optimized to focus light at three design wavelengths based on the construction of the lenses. The usage of two achromatic doublet lenses 324-326 effectively focuses light over the range including the three design wavelengths. Achromatic doublet lenses 324-326 may be configured to focus light including at least one wavelength close to or greater than the spectrum of visible light, defined as at least about 750 nm. At least one wavelength may be selected in the near infrared region of the electromagnetic spectrum. In one exemplary working embodiment, the achromatic doublet lenses selected focus light at about 706.5 nm, 855 nm and 1015 nm. This broadband performance is suitable for a low cost imager using a broadband light source such as a tungsten halogen lamp. Achromatic doublet lenses 324-326 may comprise a lens coating. The thickness and the composition of the lens coating may be selected to optimize performance of imaging assembly 300 based on the light source.

Achromatic doublet lenses 324-326 each comprise two different materials bonded together to form a doublet lens. The two different materials may be bonded with an adhesive. The bonding sites 328-330 of achromatic doublet lenses 324-326 are stressed by high temperatures and rapid temperature changes. For example, the adhesive in bonding sites 328-330 may melt or the optical properties may change due to the degrading effects of thermal cycling. In an example implementation, achromatic doublet lenses 324-326 have a thermal tolerance of 85° C. For example, while other suitable alternatives are available, imaging assembly 300 may make use of achromatic doublet lenses available at Thor Labs manufactured from glass types SFL6 and BAFN10 with Thor Labs 'B' Broadband anti-reflective coating.

Achromatic doublet lenses 324-326 are typically mounted in a heat-sinking mass such as doublet heat sink 360. Doublet heat sink 360 may comprise a large heat-sinking mass constructed from aluminum, copper, an alloy or any other material suitable for use as a heat-sinking mass for dissipating heat. In embodiments of imaging assembly 300, doublet heat sink 360 comprises an array of rows, holes, protrusions or other structure which increases the exposed surface area of doublet heat sink 360, increasing the heat dissipation rate. Additionally, forced air may be directed over or through at least a portion of doublet heat sink 360, further increasing the heat dissipation rate. Doublet heat sink 360 may be seamlessly integrated into an outer structural component of imaging assembly 300. In embodiments of imaging assembly 300, doublet heat sink 360 functions as a structural element of imaging assembly 300.

Imaging assembly 300 further comprises outer lens 332. The focused light beam exits imaging assembly 300 through outer lens 332. Reliability testing has shown that material condenses on an outermost glass surface during the sintering process if the outermost glass surface drops too low in temperature. The fogging of an outermost glass surface due to condensation causes unreliable imaging and incomplete power transmission.

Imaging assembly 300 is configured to maintain the temperature of outer lens 332 at or above a predetermined threshold temperature to ensure no condensation collects on the bottom lens, thus making it a 'self cleaning' implementation. In one or more embodiments of imaging assembly 300, the predetermined threshold temperature is a temperature above the ambient temperature surrounding a layer of sinterable powder in a 3D printer. The predetermined threshold temperature may be based on a dew temperature of a sinterable substance at atmospheric pressure. The predetermined threshold temperature for a sinterable nylon powder is generally about 140° C. The predetermined threshold temperature may be adjusted manually or automatically by a microprocessor, such as during the operation of a 3D printer usable with imaging assembly 300.

In one or more embodiments, outer lens 332 is heated via bulk absorption from the light generated by lamp 304 prior to the start of the sintering process to raise the temperature of outer lens 332. In one or more embodiments, aperture disc 320 comprises an aperture which allows maximal light transmission, and this aperture is selected for a short period prior to sintering in order to raise the temperature of outer lens 332 above the threshold temperature. Outer lens 332 then stays heated above the threshold temperature during the sintering process. Outer lens 332 is mounted within an outer mount 362 constructed from a material with a very low thermal conductivity. Outer mount 362 is constructed from a polyetherimide thermoplastic. The outer lens surface therefore remains above the threshold and condensation is avoided, reducing or eliminating the need for outer lens 332 to be cleaned periodically for proper operation.

Table 1 lists the position of elements of imaging assembly 300 in an exemplary embodiment. The measurements are given in inches away from a reference point, the aperture. The measurements refer to the points at which each component intersects the optical axis of the imaging assembly 300.

TABLE 1

| Component | Inches |
| --- | --- |
| Reflector 302 | 1.979 |
| Lamp filament 306 | 0.798 |
| Condenser lens 314 surface | 0.509 |
| Condenser lens 314 surface | 0.296 |
| Condenser lens 316 surface | 0.255 |
| Condenser lens 316 surface | 0.070 |
| Aperture 320 | 0 |
| Achromatic doublet 324 surface | 1.411 |
| Achromatic doublet bonding site 328 | 1.470 |
| Achromatic doublet 324 surface | 1.942 |
| Achromatic doublet 326 surface | 1.952 |
| Achromatic doublet bonding site 330 | 2.425 |
| Achromatic doublet surface 326 | 2.484 |
| Outer lens 332 surface | 2.494 |
| Outer lens 332 surface | 2.710 |
| Sinterable powder surface | 2.906 |

Figure 8A:
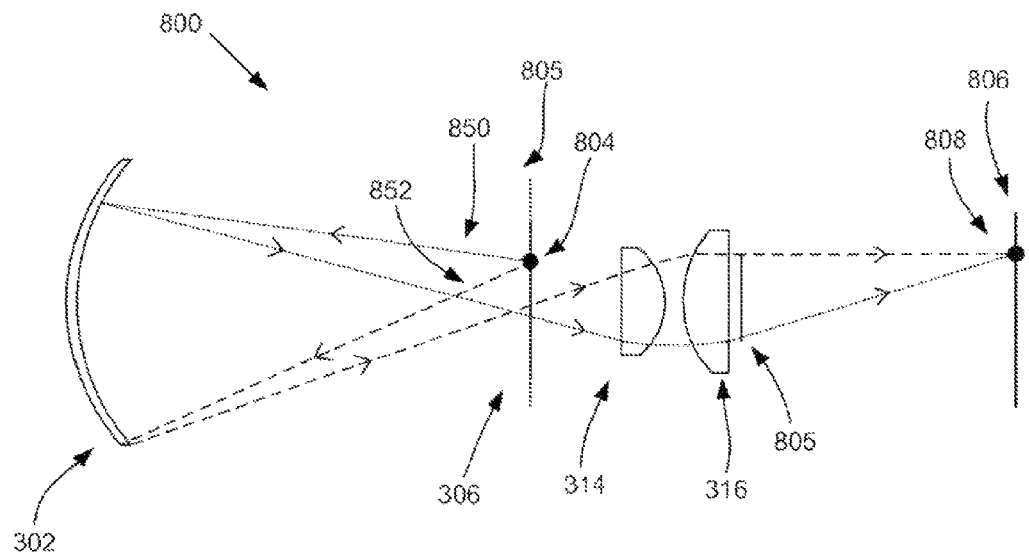
FIGS. 8A-8B are ray traces of two optical systems of an exemplary embodiment of the imaging assembly.
Figure 8B:
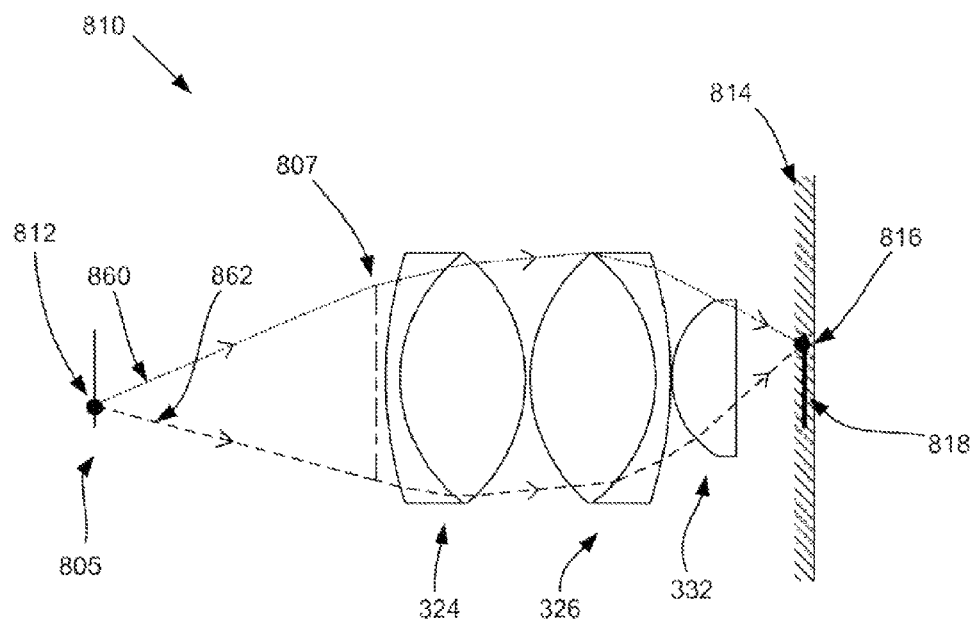

Imaging assembly 300 comprises two optical systems as shown in FIGS. 8A-8B. FIG. 5A illustrates embodiments of first optical subsystem 800 of imaging assembly 300. Lamp filament 306 lies in the object plane of first optical subsystem 800. Rays 850, 852 are generated at first object point 804 in the object plane 805. Rays 850, 852 represent the cone path of light allowed through first optical subsystem 800, wherein the light is generated at first object point 804 in a direction away from first image plane 806.

Rays 850, 852 are reflected back through the object plane of first optical subsystem 800 by reflector 302. After passing through the filament 306, rays 850, 852 travel through condenser lenses 314, 316. Condenser lenses 314, 316 focus rays 850, 852 such that they converge at first image point 808. Rays 850, 852 continue travelling through aperture 805. Aperture 805 determines the cone angle of rays which will be focused on first image plane 806. Aperture 805 may be aperture 318 of imaging assembly 300, or optionally, an aperture provided on aperture disc 320.

FIG. 8B illustrates embodiments of second optical subsystem 810 of imaging assembly 300. Aperture 805 functions as the object plane of second optical subsystem 810. Rays 860, 862 illustrate rays of light from the first image plane 806 of the first optical subsystem 800 that pass through second object point 812. Rays 860, 862 represent the cone path of light allowed through second optical subsystem 810, wherein the light passes through second object point 812.

Rays 860, 862 enter second optical subsystem 810 through entrance pupil 807 of second optical subsystem 810. Entrance pupil 807 and first image plane 806 are aligned to maximize light passing through second optical subsystem 810. First optical subsystem 800 is designed to maximize light entering second optical subsystem 810 by focusing the lamp filament image on entrance pupil 807. This maximizes the transmission of light through the system and ensures that the lamp filament is not imaged on the sintering powder. Rays 860, 862 continue travelling through achromatic doublet lenses 324, 326 and outer lens 332, which achromatically focus rays 860, 862. Rays 860, 862 converge at second image point 816 in second image plane 818. Second image plane 818 coincides with or is proximate to powder plane 814 comprising a layer of sinterable powder. Although second image plane 818 is shown to be centrally aligned with powder plane 814, one of ordinary skill in the art would appreciate that second image plane 818 may be located at any distance reasonably proximate to powder plane 814 for effective sintering without departing from the spirit of the invention.

First optical subsystem 800 and second optical subsystem 810 are configured to eliminate the formation of a conjugate image of lamp filament 306 on the second image plane 818. Furthermore, optical systems 800 and 810 of imaging assembly 300 optimize the convergence and focus of the central part of second image plane 818.

As one skilled in the art will appreciate, the spread of light from a point on the aperture plane, when focused on to the image plane where the powder is sintered, can be characterized by a point spread function. The variance of the point spread function can vary radially from the center of the beam outward. In one or more embodiments, the imaging assembly is optionally configured to minimize the variance of the point spread function at a radius $r_1 > 0$. When the radius of the smallest aperture is set to about $r_1$, the sintered image produced on the sintering layer using the smallest aperture will have a sharp edge between the sintered powder and unsintered powder, thereby enhancing the ability of the imager to produce sintered images with the fine detail. When the imaging assembly is optimized as described, the sharpness of the edge of the aperture projected on the powder and the small size of the aperture make the smallest aperture suitable for fine resolution sintering, edge work, or any time precision or sharpness is desirable. For apertures with a radius greater than $r_1$, image blur increases for areas of the image having a radius greater than $r_1$. A larger aperture size is suitable for work requiring a soft overlap and bulk fill-ins due to at least the soft overlap feature and an increase in sintering speed due to the larger aperture size.

Figure 9A:
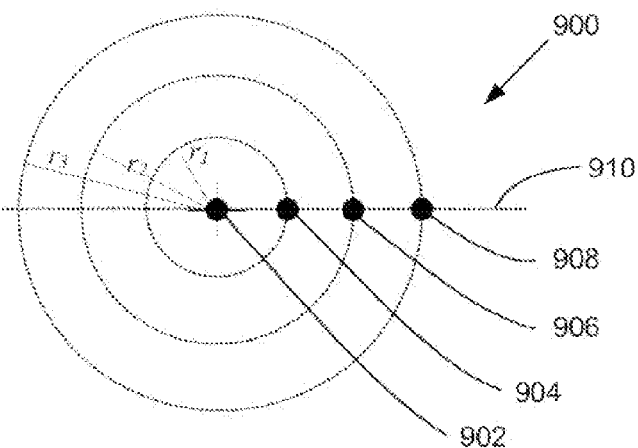
FIG. 9A-E are graphs of point spread functions which demonstrate an optimization in embodiments of the imaging assembly.
Figure 9B:
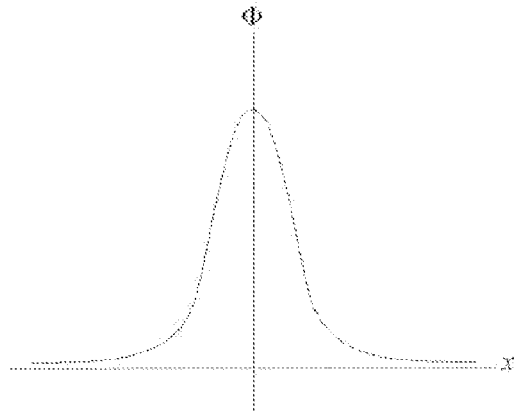
Figure 9C:
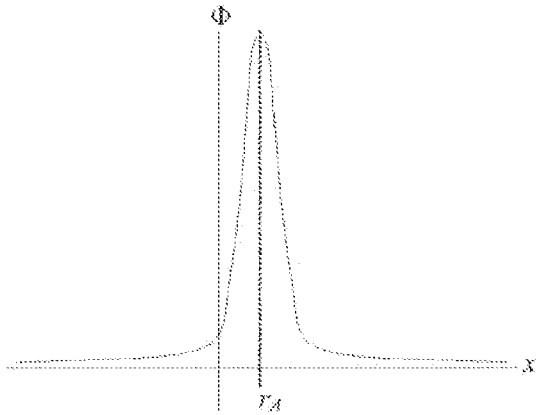

FIG. 9A shows object plane 900 of the second optical subsystem in plan view. Center point 902 coincides with the optical axis of the imaging assembly, which is perpendicular to the object plane 900. First peripheral point 904 lies in object plane 900 at distance $r_1$ from center point 902. Second peripheral point 906 lies in object plane 900 at distance $r_2$ from center point 902. Third peripheral point 908 lies in object plane 900 at distance $r_3$ from center point 902. FIGS. 9B-9E are graphs of point spread functions of the light from the imaging assembly incident on object plane 900 at points 902, 904, 906, and 908, respectively, in a imaging assembly configured to minimize a variance of the point spread function at $r_1$. Point spread functions of points 904, 906 and 908 are respectively centered around $r_A$, $r_B$ and $r_C$. Each point spread function graph shows the spatial distribution of light at a point, or more generally a radius, of the image plane. The variance of the point spread function is minimized for points in object plane 900 at a distance of $r_1$ from center point 902.

Figure 9D:
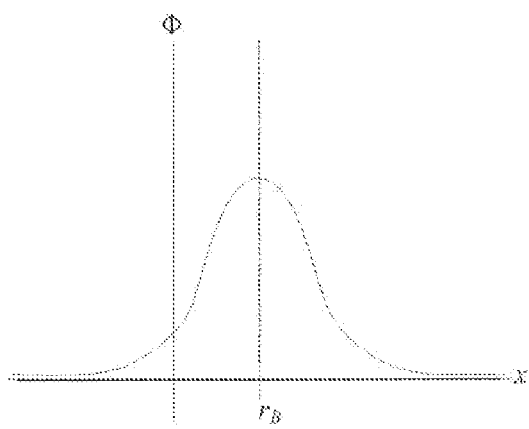
Figure 9E:
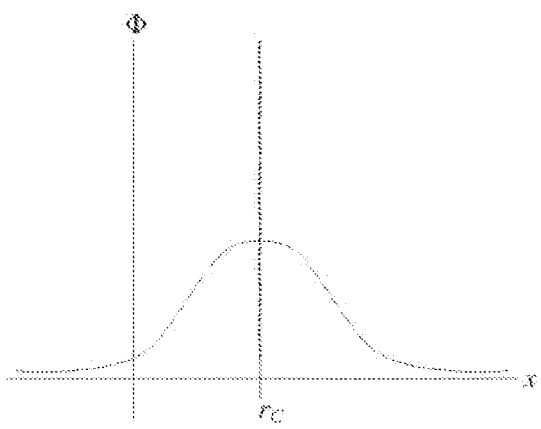

As shown in FIGS. 9D-E, the variance increases for points at a radius distance larger than $r_1$ or smaller than $r_1$ in object plane 900. In one or more embodiments, first peripheral point 904 coincides with the peripheral edge of the light spot of radius $r_1$ produced by the smallest aperture. When the aperture of smallest radius is selected, the light spot used to sinter the powder has a radius of about $r_1$ and the light spot projected on the powder has the smallest point spread function and therefore sharpest edge at the radius $r_1$, thereby enhancing the ability of the imager to sinter powder with the fine detail. As the radius of the aperture increases beyond $r_1$, image blur is increased at the edge. Although the minimization of a variance is described with respect to a circular aperture, one of skill in the art will appreciate that the same effect applies to other aperture shapes which vary in size.

Figure 4:
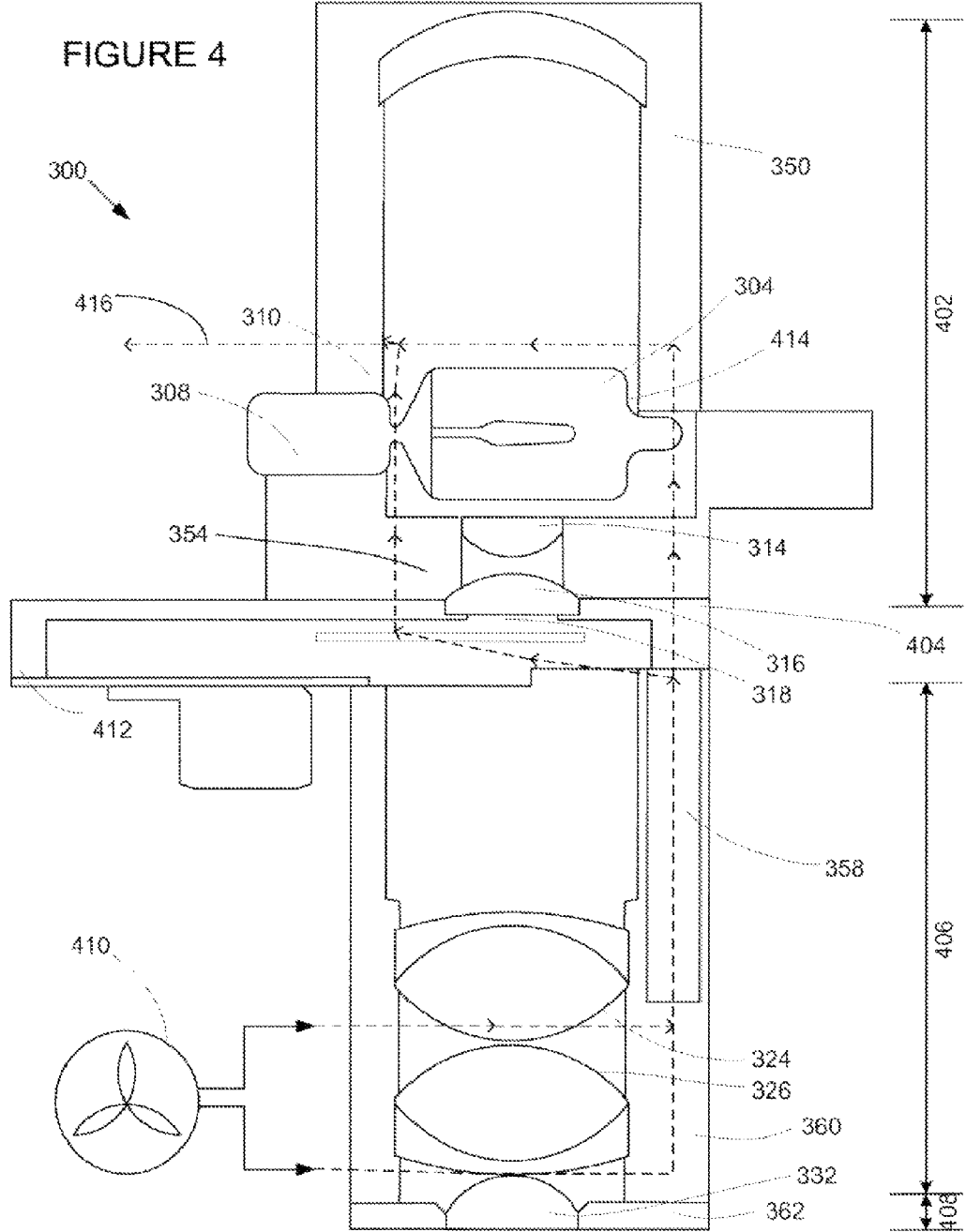
FIG. 4 is a cross sectional view of an exemplary embodiment of the imaging assembly taken along line A-A of FIG. 1.

In order to maintain the desired temperature range for optimal operation of the optical components in imaging assembly 300, a stream of forced air is directed through imaging assembly 300. The stream of forced air may be generated in a cost-effective manner by using a fan or pressurized air, for example. FIG. 4 illustrates temperature cells within imaging assembly 300 which may be achieved through materials selection and forced air cooling. Imaging assembly 300 includes fan 410 for generating a stream of forced air. The stream of forced air may travel through imaging assembly 300 via at least one channel 358 which serves as an air duct.

Doublet cell 406 includes achromatic doublet lenses 324-326. Doublet cell 406 is generally maintained below a maximum operating temperature for the optimal operation of achromatic doublet lenses 324-326. In an exemplary working embodiment of the imaging assembly, the maximum operating temperature of doublet cell 406 is approximately 85° C. Fan 410 generates a stream of air which passes over a surface or channel 358 of doublet heat sink 360 in order to remove heat and regulate the temperature of the doublet to a temperature at or below 85 degrees. In one operational embodiment, doublet heat sink 360 is constructed of black anodized aluminum with a conductivity of 180 W/mK and an approximate emissivity of 0.82.

Thermal barrier 404 is positioned between source cell 402 and doublet cell 406. In one or more embodiments, thermal barrier 404 houses the mechanical shuttering mechanism, such as aperture disc 320. In one or more embodiments, thermal barrier 404 comprises an insulating structure constructed from a material with a low thermal conductivity, such as Ultem 1000 polyetherimide, with a conductivity of 0.22 W/mK. Forced air may pass from doublet cell 406 to source cell 402 through channels in thermal barrier 404, including space near aperture 318 between condenser lens 316 and thermal barrier 404. Thermal barrier 404 is otherwise scaled to prevent forced air from leaking out of imaging assembly 330.

Source cell 402 includes lamp 304 and condenser lenses 314, 316. Forced air passes through source cell 314, 316 to maintain the temperature of lamp base below a maximum operating temperature. In an exemplary working embodiment of the imaging assembly, the maximum operating temperature of source cell 402 is 350° C. The temperature of lamp glass 414 is generally maintained above a minimum operating temperature of 250° C. In one operational embodiment of imaging assembly 300, the lamp-adjacent condenser lens 314 is an S-LAH64 lens and condenser lens 316 is a N-BK7 lens. The temperature of lamp-adjacent condenser lens 314 is maintained below a maximum operating temperature of 410° C. and the temperature of condenser lens 316 is typically maintained below a maximum operating temperature of 360° C., based on the calculation: maximum operating temperature=0.6*glass transition temperature (Tg). In one operational embodiment, lamp housing 350 is constructed of black anodized aluminum with a conductivity of 180 W/mK and an approximate emissivity of 0.82. In one or more embodiments, the forced air is directed over surfaces of lamp base 308 and lamp heat sink 310 as it exits imaging assembly 300. The forced air exiting imaging assembly 300 may be used as a heat source for another component in the system. Typically, all the mechanical parts within source cell 402 are constructed of a highly conductive material, such as black anodized aluminum, such that the thermal mass of these mechanical parts is great enough to keep all the source cell optical elements within their acceptable temperature ranges during operation.

Outer cell 408 includes outer lens 332 and outer mount 362. Outer lens 332 is primarily heated via internal and surface absorption of transmitted light generated by lamp 304. Outer mount is constructed from a material with a low thermal conductivity, such as Ultem 1000 polyetherimide, with a conductivity of 0.22 W/mK. Typically, outer lens 332 is maintained at an operational temperature range of 140-200° C. In one or more embodiments, outer cell 408 is optionally heated any other heating method instead of or in addition to surface absorption of transmitted light generated by lamp 304. In one or more embodiments, forced air used to cool elements of source cell 402 may be directed over elements of outer cell 408 after passing through source cell 402.

The embodiments shown in FIG. 4 maintain proper temperatures in doublet cell 406, source cell 402 and outer cell 408 by using the heat generated by lamp 404 and by directing forced air through imaging assembly 300. The temperature within imaging assembly 300 is passively managed. However, a person of ordinary skill in the art will appreciate that additional heating or cooling systems may be employed to maintain the correct operating temperatures for optical and electrical elements of imaging assembly 300 in doublet cell 406, source cell 402 and outer cell 408 without departing from the spirit and the scope of the invention. Typically, the system is configured to achieve high reliability without the need for expensive temperature control devices or high-temperature optics.

Figure 2:
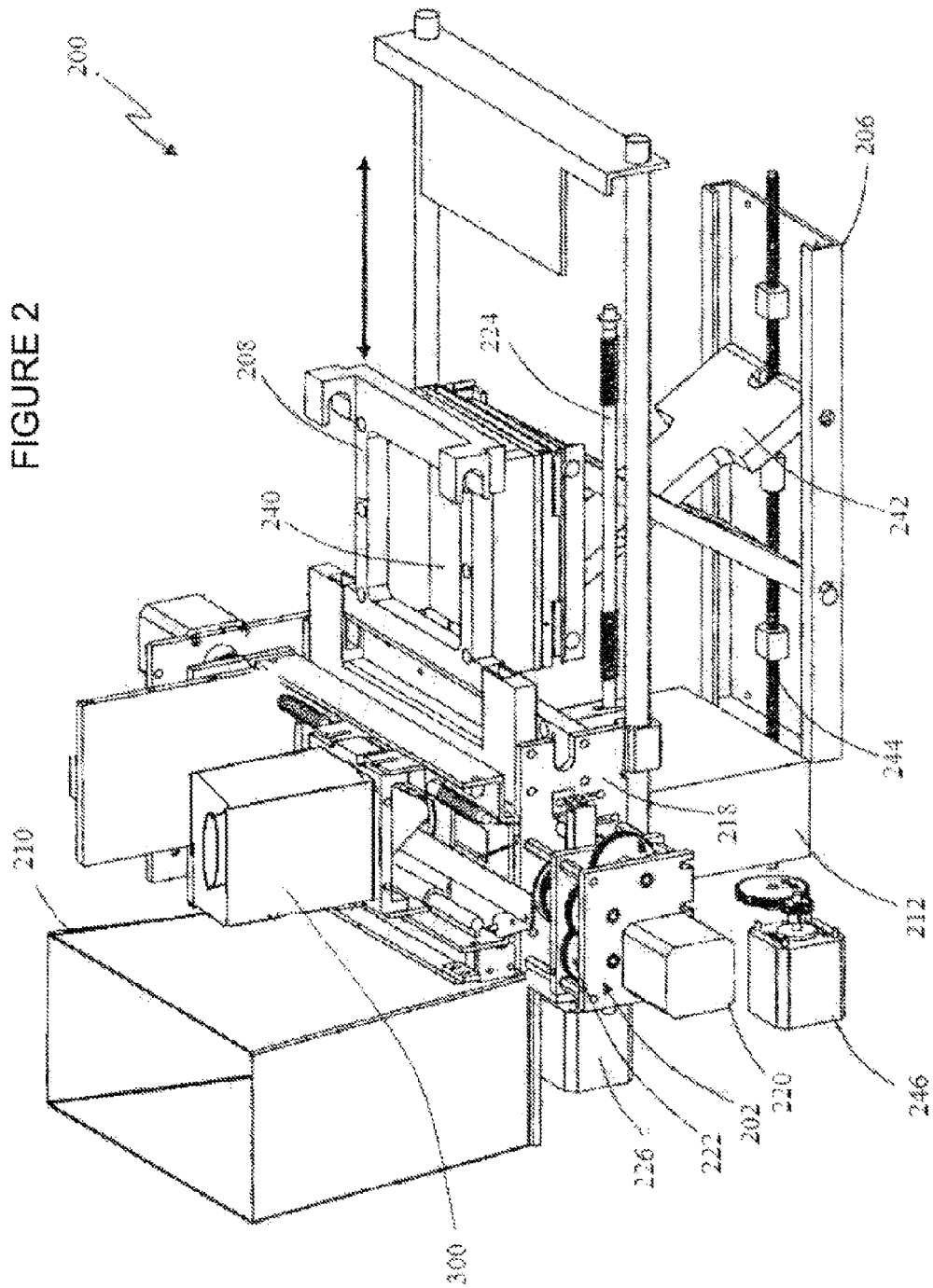
FIG. 2 is an isometric view of an exemplary three dimensional printer usable with embodiments of the imaging assembly for sintering.
Figure 5:
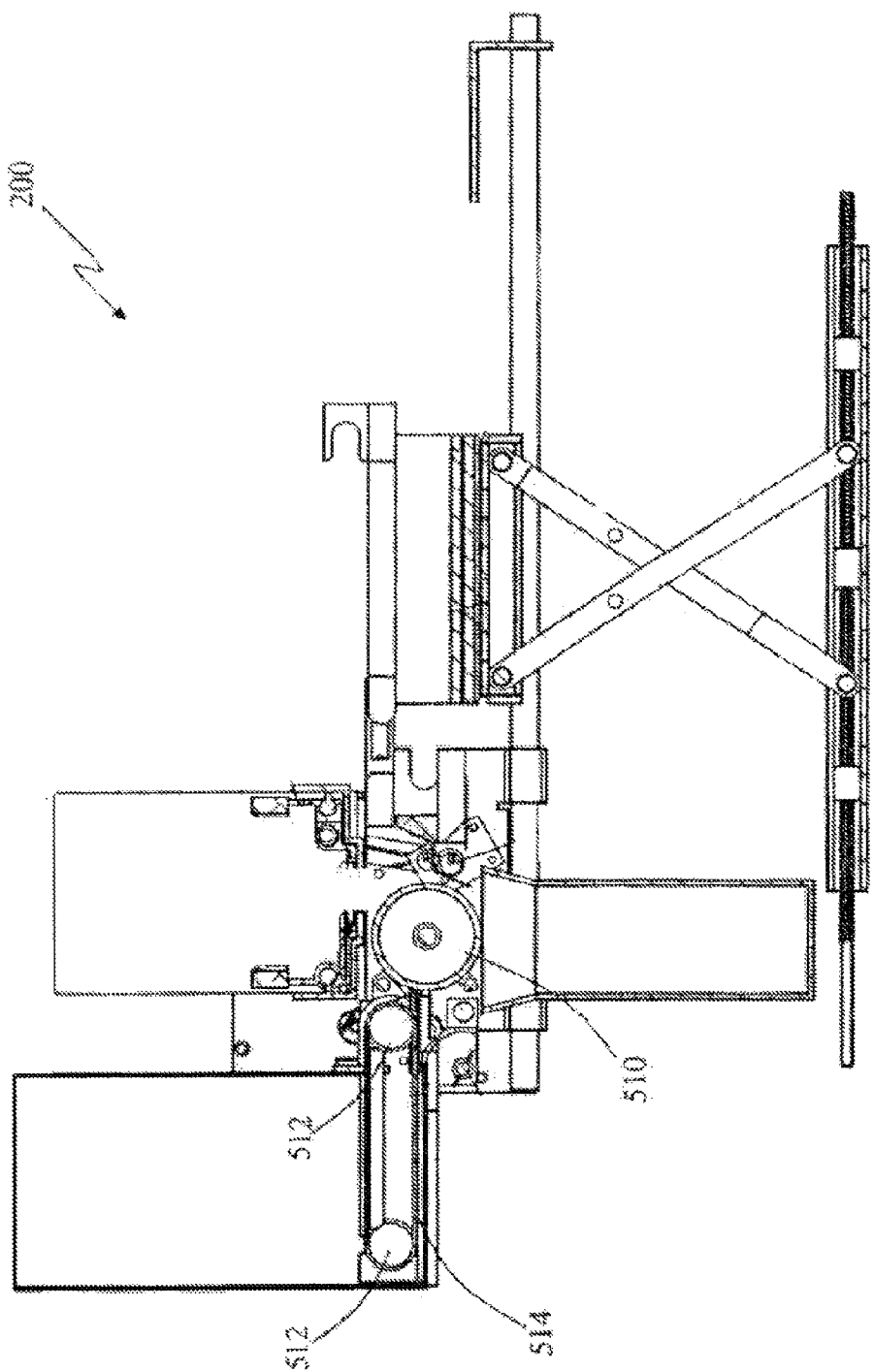
FIG. 5 is a side view of an exemplary three dimensional printer usable with embodiments of the imaging assembly for sintering.

Illustrated in FIGS. 2 and 5 is an exemplary 3D printer 200 for use with imaging assembly 300. 3D printer 200 includes drum assembly 202, imaging assembly 300, a platform assembly, and microprocessor 250. 3D printer 200 further includes sinterable powder applicator 210, sinterable powder reservoir 212, object heating element 208, and means for cleaning the roller and work surface in preparation for the next sintered image. Drum assembly 202 includes drum frame 218 and process drum 510 adapted to rotate in response to a first actuator, typically stepper motor 220, operably coupled to the drum via one or more reduction gears 222.

Drum assembly 202 further includes a second actuator, such as stepper motor 226, to drive drum 510 laterally across the length of the work surface, such as via lead screw 224. Drum 510 is typically a smooth anodized aluminum drum onto which the sinterable powder is applied. An anodized aluminum drum provides thermal stability and durability although other thermally conductive and non-conductive materials may also be used. The circumference of drum 510 is typically equal to or greater than the length of the object being constructed. In other embodiments, however, the drum may have a circumference smaller than the length of the working surface if the steps of applying the powder, imaging the powder, and depositing the sintered image are performed substantially concurrently as part of a continuous process. The outer surface of drum 510 may be coated with a nonstick surface such as TEFLON, for example, to inhibit the sintered image or the unsintered powder from unduly adhering to drum 510, to minimize heat loss into the drum during imaging, or to enable an electric field to be employed to aid powder adhesion.

The drum assembly may also include a temperature regulator and drum heating element, such as a tubular halogen lamp or cartridge heater mounted internal to drum 510 and adapted to heat drum 510 to a temperature substantially near, but lower than, the fusing point of the sinterable powder.

The sinterable powder is typically a crystalline nylon powder and the temperature to which the outer surface of the drum is raised is between approximately 2 degrees Celsius and 15 degrees Celsius below the powder's melting point. A higher roller temperature is generally employed to facilitate relatively rapid sintering of the powder with minimal input energy from the imaging lamp system, although the 3D printer system may be more susceptible to roller temperature variations and powder temperature variations that can result in unintentional sintering of powder on the roller. In contrast, the drum may be held at a lower temperature to improve sintered image quality, although the sintering process and overall object production may take longer. In some embodiments, the drum assembly further includes a transfixing heater for heating the outer side of the sintered image immediately before the sintered image is deposited on the preceding sintered image of the object. Similarly, in some embodiments the heating element may also heat the top surface of the previously deposited sintered image of the object being formed. The transfixing heater may be mounted on the assembly housing the drum 510 in proximity to the drum and the platform assembly or work surface. In order to control the amount of heat applied to the surfaces to be adhered, the transfixing heater is typically further includes an adjustable mask to limit the area of exposure for each surface.

The platform assembly includes a horizontal build surface on which the first sintered layer is deposited and the complete object assembled. Build surface 240 may incorporate heating pad 241A into the build surface on which the object is constructed from printed sintered images. The height of build surface 240 is adjusted relative to drum 510 by means of scissor lift 206 including two cross arms 242, lead screw 244 with left handed and right handed threads on either end, and an actuator, typically stepper motor 246. Rotation of lead screw 244 causes cross arms 242 to rotate toward or away from each other depending on the direction of rotation, thereby enabling build surface 240 to ascend or descend, respectively. In some embodiments, build surface 240 is adapted to rotate in the horizontal plane with respect to scissor lift 206, thereby allowing build surface 240 to be rotated to a random angle preceding the deposition of each sintered image to prevent the accumulation of repetitive errors or artifacts which, if uncorrected, may result in vertical non-uniformities or nonlinearities in the assembled object. One skilled in the art will appreciate that the orientation of the sintered image produced on drum 510 should reflect the same angular rotation as build surface 240.

For each sintered image deposited, the height of the build surface 240 relative to the drum 510 is adjusted such that the top of the object being constructed is lower than the drum 510 by a distance substantially equal to the thickness of a sintered image applied to the object. In this embodiment, the platform is lowered after each image is applied to the object, but, in another embodiment the height of the drum could be adjusted upward to compensate for the thickness of the object as the object is assembled. In some embodiments, the build surface 240 is the bottom of a object build vat having side walls that contain both the object and the unsintered powder remaining after printing of sintered images, thereby providing a foundational support for portions of subsequent sintered images that have no object immediately below them.

The actuation of the stepper motors employed in the drum assembly, the sinter assembly, and the platform assembly are typically cooperatively controlled by microprocessor 250 adapted to concurrently rotate drum 510 and translate the sinter assembly to deposit each of the plurality of cross-sections from which the object is constructed.

In some embodiments, 3D printer 200 further includes a layer thickness control processor, which may be embodied in microprocessor 250 or a separate processor, that dynamically controls the thickness of the object being constructed as the sintered image is applied to the object. The layer thickness control processor typically detects the thickness of the entire object or one or more sintered images as the object is being built and, using feedback, changes the thickness of the sinterable powder applied to drum 510 or alters the pressure used to weld a sintered image to the object. The pressure may be controlled, for example, by altering the interference gap between drum 510 and work surface so that translation of the drum across the work surface induces pressure that enhances the weld between the sintered image and object. In other embodiments, the layer thickness control processor controls the time and temperature of the pressure applied between the drum and object to achieve the desired layer density and to ensure bonding. In particular, the layer thickness control processor is adapted to vary the speed and temperature with which drum 510 is translated across the work surface between image layers to normalize the image thickness and provide optimal bond quality.

Figure 6A:
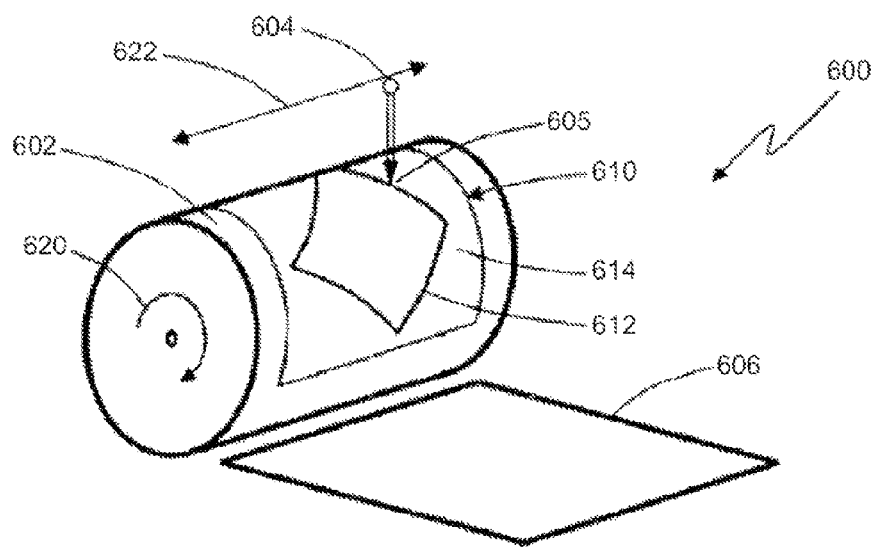
FIGS. 6A-6B are schematic diagrams demonstrating the operation of a 3D printer usable with embodiments of the imaging assembly.
Figure 6B:
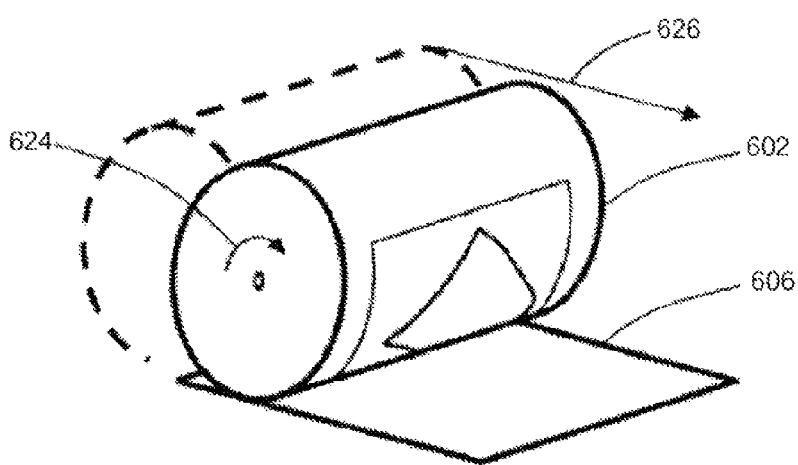

FIGS. 6A-6B are schematic diagrams demonstrating the operation of a three dimensional printer (3D printer) usable with embodiments of the sintering assembly. Drum assembly 600 is a component of a 3D printer adapted to construct a three dimensional part or object from a digital model of the object using a plurality of layers corresponding to cross sectional layers of the object. Sintered images are individually generated from a layer of sinterable powder and sequentially assembled or printed onto a stack to build the object. Heat is used to fuse particles of the powder together to form individual layers as well as fuse individual layers together into the 3D object. A sintered image is typically formed to represent a cross sectional slight of the 3D object.

As illustrated in FIG. 6A, drum assembly 600 generally includes layer processing surface 602, radiant energy source 604, and work surface 606. Layer processing surface 602, e.g., the continuous surface of a process drum or a planar surface, is adapted to rotate 620 about its longitudinal axis and pass over the work surface in a translational motion under the control of a microprocessor and transfer or otherwise deposit the layers of sintered powder onto the work surface. Work surface 606 is either a build surface on which the first sintered image is deposited or a preceding sintered image on the object being assembled. When produced on a layer processing surface separate from the object being assembled, the sintered image is permitted to express any distortion due to melting and density changes, for example, before the sintered image is affixed to the object, thereby reducing internal stresses that may arise in the object. As described below, production of the sintered image on the continuous surface of layer processing surface 602 or other heated layer processing surface does not, in the preferred embodiment, typically require the energy required to concurrently fuse the image to the previous layer.

Generally, layer processing surface 602 includes a heating element adapted to elevate the temperature of the outer surface of the drum to a predetermined value near the melting temperature of the sinterable powder employed. In preferred embodiments, the sinterable powder is a crystalline nylon powder and the temperature to which the outer surface of the drum is raised is low enough to prevent the powder from fully fusing but high enough above the ambient temperature of the sinterable powder to reduce the energy that must be injected to fuse the powder into a sintered image and subsequently, to weld or otherwise adhere the sintered image to the object under construction. Sinterable powder layer 610 is a uniform layer of sinterable powder is applied in bulk to layer processing surface 602. The sinterable powder, which is made tacky by the heat of layer processing surface 602, adheres to the drum without the particles of sinterable powder layer 610 fusing together. Electrostatic attraction may also be used in combination with a heated drum or alone with an unheated drum to releasably or removably adhere sinterable powder to the layer processing surface 602.

Portions of sinterable powder layer 610 representing a cross sectional layer of the object being formed are sintered by energy source 604, such as the imaging assembly disclosed in the present application. Energy source 604, typically a focused heat source, such as imaging assembly 300, having focal point 605 on layer processing surface 602 heats the powder to a temperature sufficient to fuse the powder. The powder is fused by partially liquefying the powder or by fully liquefying the powder which then cools back to a solid at the roller temperature once energy source 604 is removed. Sintered image 612 is formed by moving energy source 604 relative to the continuous surface of layer processing surface 602 to trace lines or regions of sintered powder across sinterable powder layer 610. In the preferred embodiment, the cross sectional layer of the object may take on any complex configuration by rotating 620 layer processing surface 602 and translating 622 heat source 604 under the control of the microprocessor. Unsintered powder continues to adhere to layer processing surface 602 in this illustrative example.

As illustrated in FIG. 6B, sintered image 612 is then transferred to work surface 606 by simultaneously rotating 624 layer processing surface 602 while translating 626 layer processing surface 602 across work surface 606. As layer processing surface 602 advances across work surface 606 from its initial position illustrated by dashed lines, sintered image 612 detaches from layer processing surface 602 and transfers to work surface 606. Sintered image 612 and the portion of the object receiving sintered image 612, may be exposed to a heat source for transfixing sintered image 612 to the object being assembled. The distance between layer processing surface 602 and work surface 606 is approximately equal to or less than the thickness of sintered image 612.

In the preferred embodiment, sintered image 612 is concurrently transferred to and fused with the object being assembled. In some embodiments, however, sintered image 612 may first be deposited onto the object and subsequently fused by, for example, a fuser lamp that follows the drum, a bulk heating process, a hot pad (discussed in more detail below), or a combination thereof.

Figure 7A:
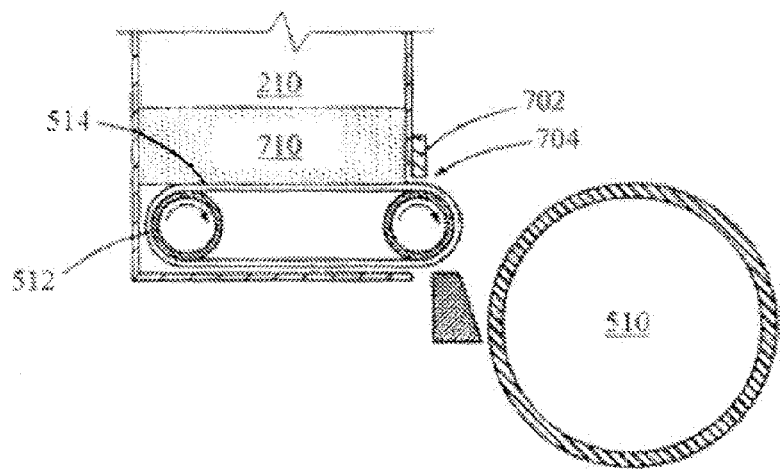
FIGS. 7A-7C are schematic diagrams demonstrating the operation of a powder applicator usable with embodiments of the imaging assembly.
Figure 7B:
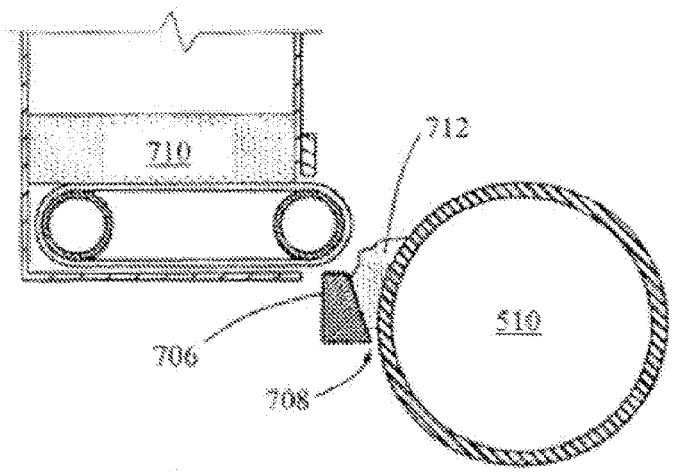
Figure 7C:
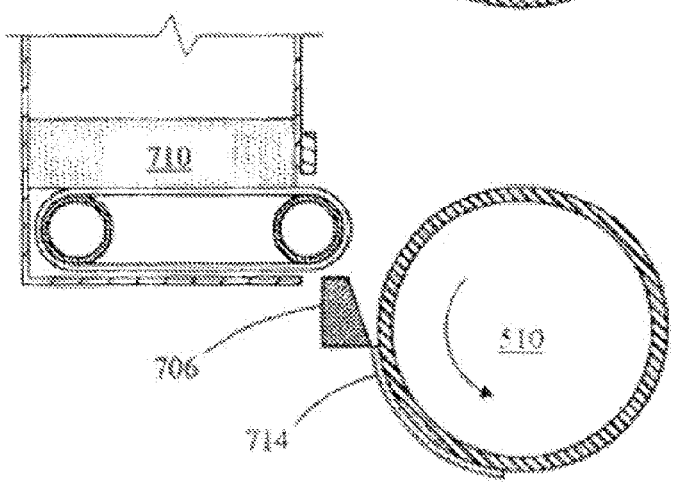

The imaging assembly may be used to sinter an image in a layer of sinterable powder. FIGS. 7A-7C are schematic diagrams demonstrating an exemplary method for the formation of a sinterable powder layer. Although a drum is shown in FIGS. 7A-7C, a surface other than a cylindrical drum may be used. The surface may be, for example, a planar surface on which the sintered layer is formed. In a 3D printer, a sintered layer formed on a planar surface may be pressed or otherwise stamped onto the work surface on the platform assembly.

Sinterable powder 710 is drawn from powder bin 210 as pulleys 512 are turned and belt 514 advances. An agitator in or attached to bin 210 may be employed to enhance the transfer of sinterable powder 710 onto drum 510. The volume of sinterable powder 710 dispensed by belt 514 is controlled by adjustable gate 702 and gap 704 underneath adjustable gate 702. As sinterable powder 710 falls off of belt 514 to the cavity above layer control blade 706, the powder density is normalized to ensure uniform and repeatable density as sinterable powder 710 is applied to drum 510 regardless of how sinterable powder 710 was compacted in powder bin 210. Dispensed powder 712 accumulates against drum 510 and layer control blade 706 is used to regulate the thickness and uniformity of layered powder 714 applied to the drum 510. Layer gap 708 created between layer control blade 706 and drum 510 is wedge-shaped with a relatively wide upper gap to properly draw powder and a narrower lower gap to spread the powder uniformly across the width of the drum 510—and compact the powder to the proper density—as drum 510 is turned. The thickness of layered powder 714 produced is generally between 5 and 20 mils thick depending on the vertical resolution of the object required. A heating lamp may be used inside drum 510 to heat the surface of drum 510, facilitating the adhesion of the layered powder 714 the surface of drum 510.

Typically, the sinterable powder is a crystalline plastic powder such as Nylon #12 having an average particle size of 60 microns although this is subject to variation depending on the 3D printing requirements and the manufacturing method, for example. In some embodiments, the sinterable powder includes a distribution of two or more particle sizes, namely a first set of relatively large particles and a second set of relatively small particles where the diameter of the smaller particles is selected to substantially fill the inter-particle voids present between the larger particles, thereby increasing the density of the sintered powder and reducing the shrinkage of the object. The distribution of particle sizes, referred to herein as a modal distribution, may include a plurality of nominal particle size, each being successively smaller, to provide maximal powder density.

In the alternative to Nylon #12, various other sinterable materials may also be employed including Nylon #11, Acrylate Butadiene Styrene (ABS), Polystyrene and other powders with a similar particle size. The sinterable powder may further include a radiation absorbent agent or dye that increases the effective absorptivity, which is substantially symmetric to the emissivity, of the powder in the wavelength band of radiation emitted by the heat source. For example when the heat source is visible light black or grey, coloring agents may be employed to increase the powder's energy absorption, thereby increasing the rate at which the powder may be sintered and the object assembled. The radiation absorbent agent may also allow lower power incoherent energy sources including lamps as well as coherent energy sources including laser and laser diodes to be used as a sintering radiation source. In other embodiments using a laser or laser diode, the dye may be absorptive primarily in the narrow emission band of the laser.

In some embodiments, the 3D printer 200 is adapted to produce one or more sintered images from a sinterable powder including metal, for example. One exemplary product is distributed under the trade name METAL MATRIX PLASTIC by Hi-Temp Structures of Gardena, Calif.

While the invention herein disclosed has been described by means of specific embodiments and applications thereof, numerous modifications and variations could be made thereto by those skilled in the art without departing from the scope of the invention set forth in the claims.

What is claimed is:

1. A solid imaging system for producing physical objects from sinterable powder based upon 3D designs, the solid imaging system comprising:
   an aperture system comprising:
   a light source;
   at least one aperture comprising a first aperture, said first aperture interposed between the light source and a layer of sinterable powder; and
   an optical system comprising one or more lenses, wherein said optical system is configured to focus light from said aperture onto said layer of sinterable powder; and
   a sinterable powder applicator for applying the layer of sinterable powder within the solid imaging system;
   wherein said optical system comprises an object plane, and said first aperture coincides with said object plane such that an image of said first aperture is projected onto said layer of sinterable powder, said image being characterized by an outer diameter, and
   wherein said light focused on the layer of sinterable powder is characterized by a point spread function, and a variance of the point spread function in proximity to the outer diameter of said image is less than a variance of the point spread function in proximity to the center of the image.

2. The solid imaging system of claim 1, further comprising an aperture disc, wherein said aperture disc comprises said at least one aperture and at least one opaque area.

3. The solid imaging system of claim 2, further comprising a stepper motor configured to rotate said aperture disc to interpose a selected aperture between said light source said layer of sinterable powder to define a shape of a light spot projected on said layer of sinterable powder.

4. The solid imaging system of claim 1, wherein said at least one aperture comprises a plurality of selectable apertures of different sizes.

5. The solid imaging system of claim 1, wherein a shape of said first aperture comprises one or more polygons.

6. The solid imaging system of claim 5, wherein said shape of said first aperture is a polygon selected from a group consisting of a circle, a rectangle, a slit and a square.

7. The solid imaging system of claim 5, wherein said shape of said first aperture comprises multiple parallel slits configured to sinter a cross-hatch pattern in said layer of sinterable powder.

8. The solid imaging system of claim 7, wherein said multiple parallel slits are curvilinear.

9. A solid imaging system for producing physical objects from sinterable powder based upon 3D designs, the solid imaging system comprising:
   an imaging system comprising:
   a light source;
   an outer lens positioned on an exterior of said imaging system and in proximity to a layer of sinterable powder; and
   a temperature control system configured to heat an outer lens to at least a predetermined temperature;
   wherein an image is projected on a surface comprising said layer of sinterable powder; and
   a sinterable powder applicator for applying the layer of sinterable powder within the solid imaging system;
   at least one achromatic doublet lens, and wherein said temperature control system is further configured to dissipate heat from said at least one achromatic doublet lens; and
   wherein the solid imaging system further comprises a source cell associated with said light source and a doublet cell associated with said least one achromatic doublet lens, wherein said temperature control system maintains said source cell below a first predetermined operational temperature and said temperature control system maintains said doublet cell below a second predetermined operational temperature; and wherein the solid imaging system further comprises a thermal barrier separating said doublet cell and source cell.

10. The solid imaging system of claim 9, wherein said temperature control system is further configured to dissipate heat from said light source.

11. The solid imaging system of claim 9, wherein said first predetermined temperature is higher than said second predetermined temperature.

12. The solid imaging system of claim 11, wherein a cooling element of said temperature control system is used to cool said doublet cell before cooling said source cell.

13. The solid imaging system of claim 12, wherein said cooling element is forced air.

14. The solid imaging system of claim 9, wherein said first predetermined operational temperature is about 350° C.

15. The solid imaging system of claim 9, wherein said second predetermined operational temperature is about 85° C.

16. The solid imaging system of claim 9, wherein at least one of said light source and said at least one achromatic doublet lens is mounted in a material with high thermal conductivity and wherein a cooling element of said temperature control system is directed over said material.

17. The solid imaging system of claim 9, wherein said temperature control system heats said outer lens using waste heat of said temperature control system, wherein said waste heat is generated by said light source.

18. The solid imaging system of claim 17, wherein said waste heat comprises heat in a stream of forced air, wherein said heat is collected from at least one of said light source and said at least one achromatic doublet lens.

19. The solid imaging system of claim 9, wherein said predetermined temperature is about an ambient temperature of said layer of sinterable powder.

20. The solid imaging system of claim 9, wherein said predetermined temperature is about a melting temperature of a material comprising said layer of sinterable powder.

* * * * *